(12) United States Patent
Wu et al.

(10) Patent No.: US 10,823,571 B1
(45) Date of Patent: Nov. 3, 2020

(54) SWITCHING SBS GYRO WITH FIXED PUMP SEPARATION

(71) Applicant: Honeywell International Inc., Morris Plains, NJ (US)

(72) Inventors: Jianfeng Wu, Tucson, AZ (US); Karl D. Nelson, Plymouth, MN (US); Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/527,989

(22) Filed: Jul. 31, 2019

(51) Int. Cl.
*G01C 19/70* (2006.01)
*G01C 19/66* (2006.01)

(52) U.S. Cl.
CPC ........... *G01C 19/70* (2013.01); *G01C 19/665* (2013.01)

(58) Field of Classification Search
CPC .................................................. G01C 19/665
See application file for complete search history.

(56) References Cited

U.S. PATENT DOCUMENTS

| | | | |
|---|---|---|---|
| 4,159,178 A | 6/1979 | Vali et al. | |
| 4,396,290 A | 8/1983 | Morris | |
| 4,456,376 A * | 6/1984 | Carrington | G01C 19/72 356/464 |
| 4,530,097 A | 7/1985 | Stokes et al. | |
| 4,863,272 A | 9/1989 | Coccoli | |
| 5,064,288 A | 11/1991 | Dyes et al. | |
| 5,323,415 A | 6/1994 | Quast et al. | |
| 5,351,252 A | 9/1994 | Toyama et al. | |
| 5,406,370 A | 4/1995 | Huang et al. | |
| 5,408,317 A | 4/1995 | Dyes et al. | |
| 5,517,305 A | 5/1996 | Raab | |
| 5,537,671 A | 7/1996 | Toyama et al. | |
| 6,424,664 B1 | 7/2002 | Oh et al. | |
| 6,650,682 B1 * | 11/2003 | Diels | G01C 19/66 372/25 |
| 7,024,069 B2 | 4/2006 | Savchenkov et al. | |
| 7,065,276 B2 | 6/2006 | Scheuer et al. | |
| 7,184,624 B1 | 2/2007 | Matsko et al. | |
| 7,372,574 B2 | 5/2008 | Sanders et al. | |
| 7,463,360 B2 | 12/2008 | Hughes et al. | |
| 8,289,616 B1 | 10/2012 | Maleki et al. | |
| 8,514,400 B2 | 8/2013 | Mohageg et al. | |

(Continued)

OTHER PUBLICATIONS

Li et al., "Microresonator Brillouin gyroscope", Optica, Mar. 2017, pp. 346-348, vol. 4, No. 3, Optical Society of America.

*Primary Examiner* — Michael P LaPage
(74) *Attorney, Agent, or Firm* — Fogg & Powers LLC

(57) ABSTRACT

A ring-laser gyroscope which generates in an optical ring resonator and in response to a first pump beam, a first back-scattered beam propagating in a direction; generates in the optical ring resonator and in response to a second pumped beam, a second back-scattered beam propagating in an opposite direction; determines a first difference between the frequencies of the first and second back-scattered beams; reverses the directions of the first and second back-scattered beams; determines a second difference between the frequencies of the first and second back-scattered beams; determines a third difference between the first and second differences; and determines a rotation of the optical ring resonator in response to the third difference.

20 Claims, 7 Drawing Sheets

(56) References Cited

U.S. PATENT DOCUMENTS

| | | |
|---|---|---|
| 8,659,760 B2 | 2/2014 | Sanders et al. |
| 8,830,478 B2 | 9/2014 | Wu et al. |
| 9,197,032 B2 | 11/2015 | Qiu et al. |
| 9,581,448 B2 | 2/2017 | Christensen et al. |
| 9,733,084 B2 | 8/2017 | Salit et al. |
| 9,772,187 B2 | 9/2017 | Salit et al. |
| 2011/0255094 A1 | 10/2011 | Mohageg et al. |
| 2012/0189025 A1 | 7/2012 | Zheng et al. |
| 2014/0152994 A1 | 6/2014 | Wu et al. |
| 2016/0204571 A1 | 7/2016 | Wu et al. |
| 2018/0356229 A1* | 12/2018 | Porsandeh Khial .................... G01C 19/727 |
| 2019/0049249 A1* | 2/2019 | Wu .................... G02B 6/12007 |
| 2020/0041270 A1* | 2/2020 | White .................. G01C 19/661 |

\* cited by examiner

SWITCHING SBS GYRO WITH FIXED PUMP SEPARATION

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

SUMMARY

There is a need for low-cost, high-performance gyroscopes for navigation systems, precision-point systems, and guidance systems.

Although the navigation-grade gyro market has traditionally favored He—Ne ring laser gyroscopes ("RLGs") such as the GGI320, such conventional RLGs may be unsuitable for thermally extreme, high-shock, and high-vibration applications in GPS denied-missions. In part, this unsuitability may derive from the convention RLG's use of a dither motor to prevent degermation of resonance frequencies. Such dither motors may rely on fragile moving parts that are unsuitable for high-shock and high-vibration applications. The integration of optical waveguides on a single silicon substrate with no moving parts offers an advantage in demanding environments.

At a high level, RLGs allow for measurement of angular rotation through the change in the perceived cavity length of an optical ring between two lasers propagating through the optical ring in opposite directions of travel, for example clockwise ("CW") and counter-clockwise ("CCW"). Each direction of travel within the optical ring has a resonance frequency which is proportionally related to the perceived cavity length of the optical ring. Each of the co-propagating laser tracks the resonance frequency of the RLG in their direction of travel. The measured separation between two resonance frequencies is determined by the rotation rate and gyro scale factor. However, when the rotation rate is small, two resonance frequencies lock together preventing measurement of angular rotation.

The present invention includes a ring-laser gyroscope, comprising: a first optical pump configured to generate a first pumped beam; a second optical pump configured to generate a second pumped beam; an optical ring resonator configured to generate, in response to the first optical pumped beam, a first back-scattered Stimulated Brillouin Scattered (SBS) beam propagating in a direction opposite to a direction in which the first optical beam is propagating, and to generate, in response to the second optical beam, a second back-scattered Stimulated Brillouin Scattered (SBS) beam propagating in a direction opposite to a direction in which the second optical beam is propagating; a switch having a first state in which the switch is configured to cause the first and second optical beams to propagate in the optical ring resonator in first and second directions, respectively, and having a second state in which the switch is configured to cause the first and second optical beams to propagate in the optical ring resonator in the second and first directions, respectively; and a detector coupled to the optical ring resonator and configured to determine an optical beat signal in response to the first and second back-scattered optical beams in both switching states.

DRAWINGS

Understanding that the drawings may depict only some embodiments and are not, therefore, to be considered limiting in scope, the exemplary embodiments are described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, electrical, and other changes may be made.

The systems and methods described herein take advantage of the properties of stimulated Brillouin scattering ("SBS") by generating first-order stimulated Brillouin scattered light from two pump lasers of different known frequencies. The optical pumped beams propagate in opposite directions, clockwise ("CW") and counter-clockwise ("CCW"), thus the two first-order SBS beams propagate in opposite directions as well. Generally, when lasing beams interact in a ring laser gyroscope, a lock-in effect occurs, locking the CW and CCW lasers together, preventing the measurement of angular rotation. By separating the CW and CCW pumped beams by one Free Spectral Range ("FSR"), such that the CCW and CW first-order SBS beams are also separated by one FSR, the SBS beams are separated largely enough and do not lock together. Resonators have resonance frequencies to which the optical pumped beams track. By definition, two adjacent resonance frequencies of a resonator are separated by one free spectral range. When two optical pumped beams are set one or more integer FSRs apart generate backscattering, the two back scatterings, first-order SBS lasers, together produce a beat signal from which can be used to calculate the FSR between the first-order SBS lasers as well as the rate of rotation (i.e., angular velocity) Δf about an input axis of the gyroscope.

Further details of the present ring laser gyroscope are described hereafter with reference to the drawings.

Figure 1:
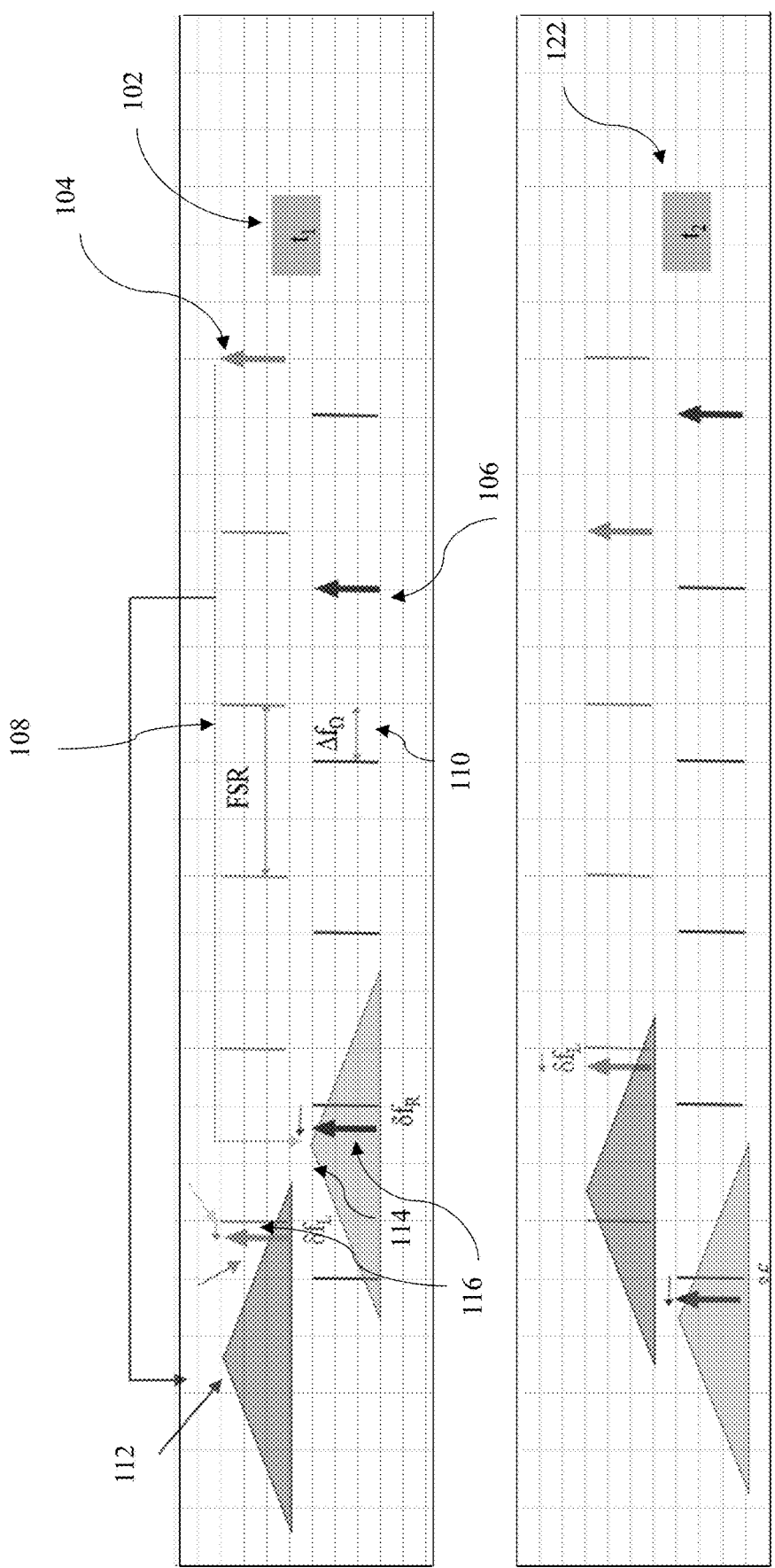
FIG. 1 is a plot of the frequency distribution of two co-propagating beams in a ring laser gyroscope where both beams produce backscattering.

FIG. 1 shows a diagram of the effects of switching co-propagating beams within an RLG cavity. The top graph 102 depicts a first optical pumped beam 104, propagating CW, and a second optical pumped beam 106, propagating CCW, at an initial time, $t_1$. In the graph 102 the cavity resonance frequencies in both CW and CCW directions are depicted as vertical lines, the spacing between the lines in the same direction inherently being defined as the FSR. The resonance frequencies between CW and CCW are shifted due to rotation and is indicated by $\Delta f_\Omega$ 110. The first optical pumped beam 104 is set at a frequency and the second optical pumped beam 106 is set at a frequency at least one FSR away from the frequency of the first optical pumped beam 104. When the first optical pumped beam 104 produces a Brillouin backscattering, the gain peak of the backscattering 112 can be estimated as the frequency of the first optical pumped beam 104 separated by a gain shift of ~10.8 GHz. Similarly, when the second optical pumped beam 106 produces a Brillouin backscattering, the gain peak of the backscattering 114 can be estimated to be the frequency of the second optical pumped beam 106 separated by a gain shift of ~10.8 GHz. Due to gain pulling effect, the backscattering SBS laser beams will experience shifting 116.

The bottom graph 122 depicts the pumped beams at $t_2$, where the first optical pumped beam 104 propagates CCW and the second optical pumped beam 106 propagates CW. The switching of directions of the optical pumped beams causes the beat signal from FSR+$\Delta f_\Omega$ to FSR-$\Delta f_\Omega$.

Figure 2A:
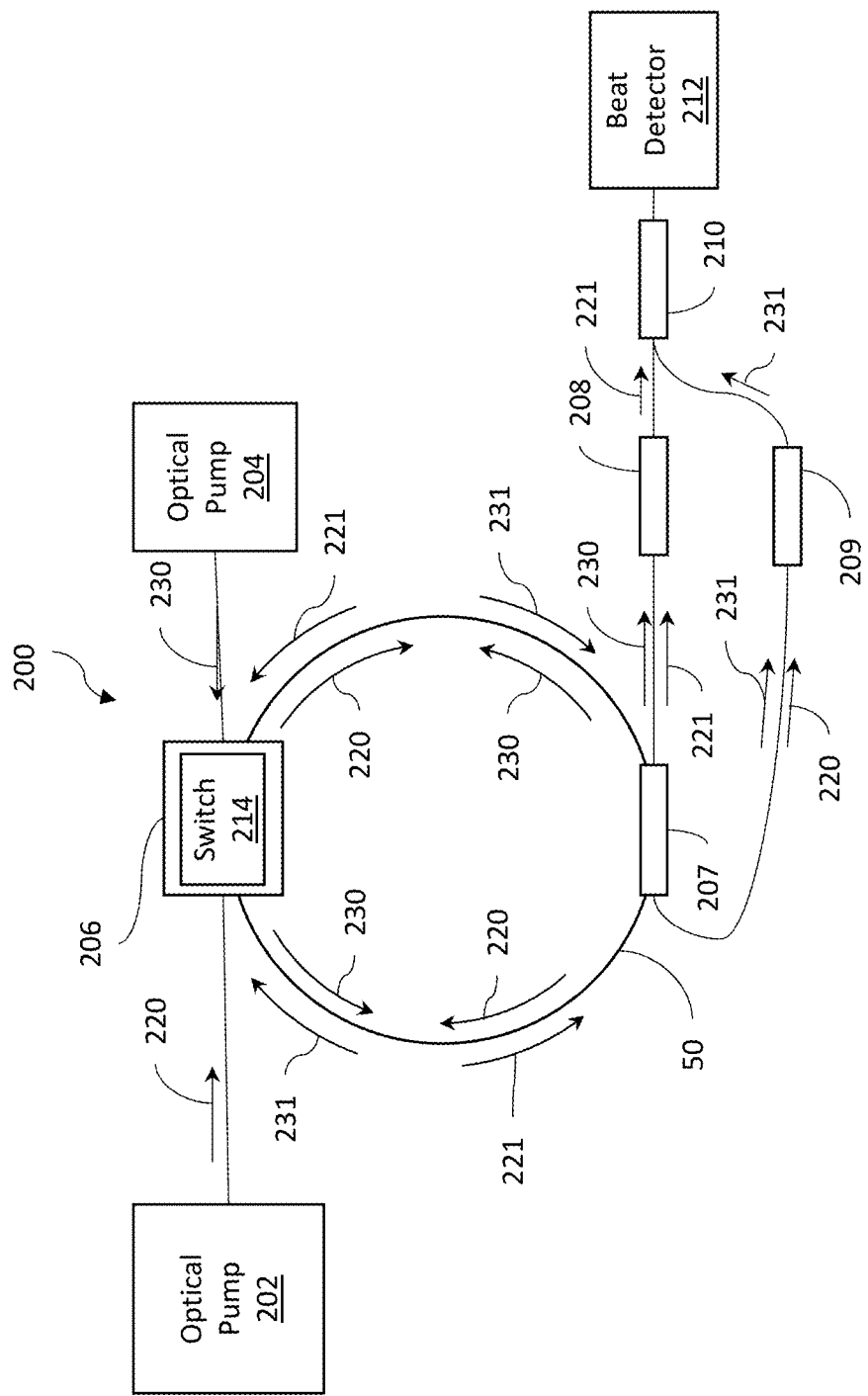
FIG. 2A is a diagram of a portion of an embodiment of a ring laser gyroscope "RLG" in which a first optical pumped beam, a second optical pumped beam, a first first-order stimulated Brillouin scattering "SBS" beam, and a second first-order SBS beam counter propagate within the RLG according to an embodiment.

As shown in FIG. 2A of the ring-laser-gyroscope portion 200, a first optical pump beam 220 is emitted from a first optical source (e.g., a pumped beam, a pump laser, a pumped laser 202) and a second optical pump beam 230 is emitted from a second optical source (e.g., a pumped beam, a pump laser, a pumped laser 204). The optical ring resonator 50 has a first directional optical coupling region 206 and a second directional optical coupling region 207. The first optical coupling region 206 includes an optical switching mechanism 214, hereinafter referred to as a switch 214, which is configured to reverse the directions of the first optical pump beam 220 and the second optical pump beam 230 such that a beam traveling in the first direction within the optical ring resonator 50 while the switch 214 is in a first state travels in the second direction within the optical ring resonator 50 while the switch 214 is in a second state, and vice versa.

In an embodiment, the optical ring resonator 50 is a rigid optical waveguide resonator 50, which can be formed in or from any suitable material such as a semiconductor material, glass. The rigid optical waveguide resonator 50 can be formed in or on a substrate using a conventional process. In another embodiment, the optical ring resonator 50 is an optical fiber resonator formed from an optical fiber. In an embodiment, the optical ring resonator 50 is a rigid optical waveguide. In another embodiment, the optical ring resonator 50 is an optical fiber. In yet another implementation of this embodiment, the optical beams in the ring laser gyroscope external to the optical ring resonator 50 are guided through rigid optical waveguides. In yet another implementation of this embodiment, the optical beams in the ring laser gyroscope external to the optical ring resonator 50 are guided through optical fibers. In yet another implementation of this embodiment, the optical beams in the ring laser gyroscope external to the optical ring resonator 50 propagate through air and are guided through a combination of optical fiber and rigid waveguides.

As the optical pump beams 220 and 230 propagate through the optical ring resonator 50 in opposite directions, first Stokes waves are stimulated by the optical pump beams 220 and 230 at respective first Stokes wave frequencies, $v_{SBS1}$ and $v_{SBS2}$, that are downshifted by a Brillouin Stokes frequency, $f_{SBS}$, from the pump frequency, $v_{p1}$ $v_{p2}$. The optical ring resonator has a resonator mode within the bandwidth of the first optical gain curve. With sufficiently low resonator loss, the optical gain in the first optical gain curve supports SBS laser.

In order to prevent the locking effect, the second optical pumped beam 230 is set to a frequency approximately an integer number of free spectral ranges apart from the first optical pumped beam 220. For example, the second pumped beam 230 can be set at one free spectral range from the first optical pumped beam 220. In one embodiment, the first optical pumped beam 220 is locked to a resonance peak of the optical ring resonator 50. In this embodiment, the second optical pumped beam 230 is locked to another resonance peak that is an integer number of free spectral ranges from the first optical pumped beam 220. By locking the optical pumped beams 220 230 to remain an integer number of free spectral ranges apart, the first first-order SBS beam 221 produced by the first optical pumped beam 220 and the second first-order SBS beam 231 produced by the second optical pumped beam 230 will also be that integer number of free spectral ranges apart from one another.

A first optical filter 209 optically couples to the second optical coupling region 207. A portion of the light propagating in the first direction (i.e. the first optical pumped beam 220 and the second first order SBS beam 231 propagating in the CW direction) travels from the second optical coupling region 207 into the first optical filter 209. The first optical filter 209 has a pass band tuned to pass the second first-order SBS beam 231 and reject the first optical pumped beam 220. The first optical filter 209 may also be referred to as a "pump rejection filter 209". For example, the optical filters described herein can be optical ring resonators or Bragg gratings. The second first-order SBS beam 231 propagates from the first optical filter 209 to the directional coupler 210.

A second optical filter 208 optically couples to accept input from the second optical coupling region 207. A portion of the light propagating in the second direction (i.e., the second optical pumped beam 230 and the first first-order SBS beam 221 propagating in the CCW direction) propagates from the second optical coupling region 207 to the input of the second optical filter 208. The second optical filter 208 has a pass band turned to pass the first first-order SBS beam 221 and reject the second optical pumped beam 230. The first first-order SBS beam 221 propagates from the second optical filter 209 to the directional coupler 210. The coupler 210 combines the first first-order SBS beam 221 and the second first-order SBS beam 231 and send them to the beat detector 212. The beat frequency equal to the difference between the first frequency $v_{SBS1}$ of the first first-order SBS beam and the second frequency $v_{SBS2}$ of the second first-order SBS beam. The beat detector 212 produces an optical beat signal that varies as a function of a frequency difference between the first first-order SBS beam 221 and the second first-order SBS beam 231. The generated beat signal between the first first-order SBS beam 221 and the second first-order SBS beam 231 is approximately equal to one FSR plus the rotation-induced frequency shift:

$$f_{beat,1} \sim FSR + \Delta f \qquad (1)$$

This beat frequency is determined, $f_{beat,t1}$. After the beat frequency between the first first-order SBS beam 221 and the second first-order SBS beam 231 has been determined in the first set of directions, the directions of the first optical pumped beam 220 and the second optical pumped beam 230 reverse using the switch 214.

Figure 2B:
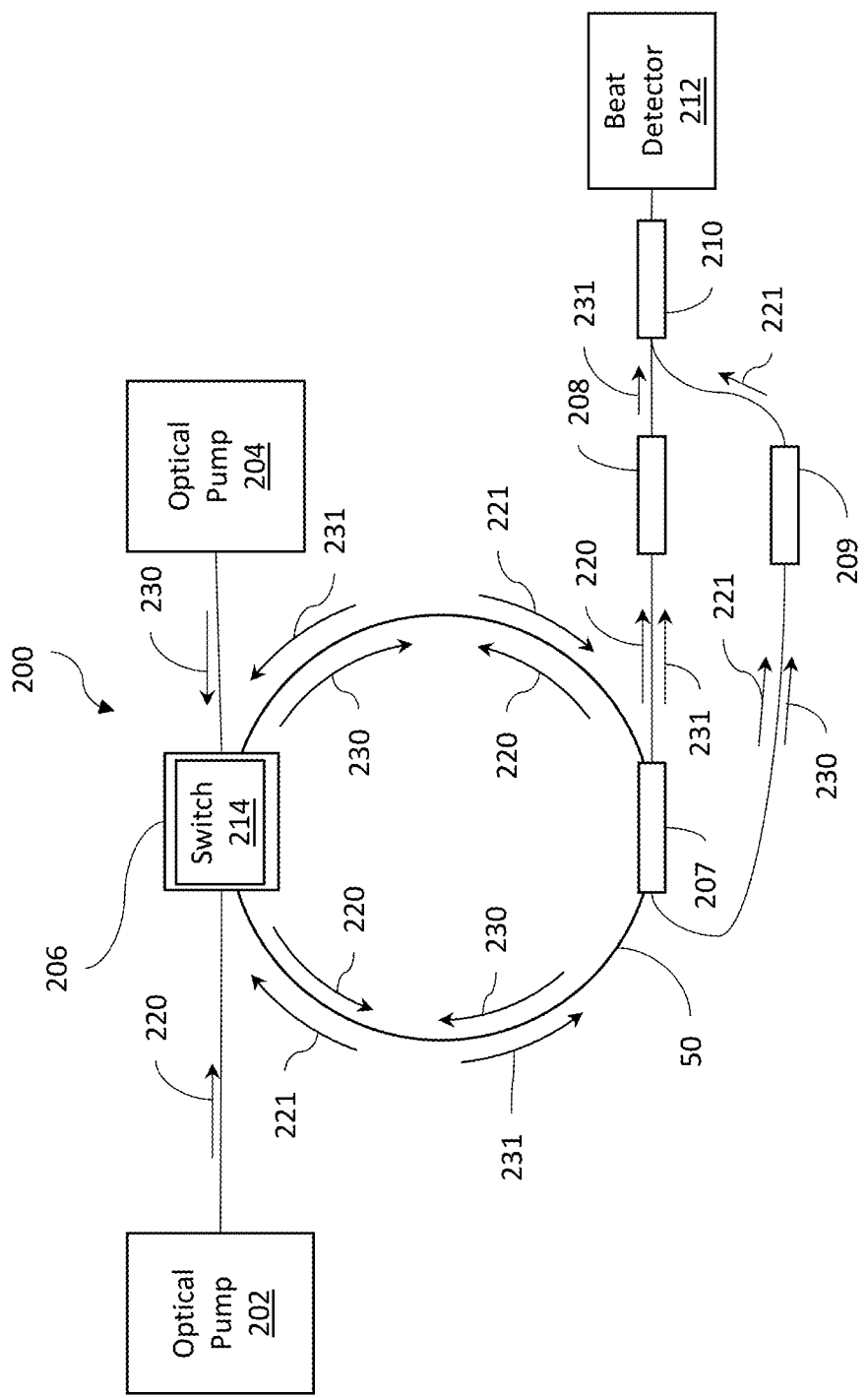
FIG. 2B is a diagram of a portion of an embodiment of a ring laser gyroscope in which switching of the optical pumped beams has occurred, according to an embodiment such that the optical pumped beams co-propagate in the opposite direction as before.

FIG. 2B shows the RLG portion 200 of FIG. 2A after the switch 214 mechanism has reversed the directions of the first optical pumped beam 220 and the second optical pumped beam 230 within the ring resonator cavity in time period 2 (t2). The first optical pumped beam 220 now propagates in the second direction (CCW), and the second optical pumped beam 230 now propagates in the first direction (CW). Thus, the first first-order SBS beam 221 now propagates in the first direction (CW), and the second first-order SBS beam 231 now operates in the second direction (CCW). Excepting the reversal of the directions of the co-propagating beams, the descriptions of the components within Figure the RLG portion 200 of FIG. 2A apply to the FIG. 2B counterparts.

In FIG. 2B, the beat detector 212 produces an optical beat signal that varies as a frequency difference between the first first-order SBS beam 221 and the second first-order SBS beam 231. Because the co-propagating beams have been reversed, the generated beat signal between the first first-order SBS beam 221 and the second first-order SBS beam 231 is approximately equal to the difference of one FSR and the rotation-induced frequency shift:

$$f_{beat,t2} \sim FSR - \Delta f \qquad (2)$$

This beat frequency is determined, $f_{beat,t2}$. When the directions of the first first-order SBS beam 221 and the second first order SBS beam 231 are measured, the delta function changes sign because the beams have been reversed in regard to the direction of movement, but the beams relationship to one another remains the same, thus the FSR remains positive.

Assuming each switching period is so short that neither FSR nor $\Delta f_\Omega$ changes between t1 and t2, FSR can be determined by taking the summation of the beat frequencies before and after the reversal of the optical pumped beams 220 and 230.

$$FSR_{t1,t2} = \frac{f_{beat,t1} + f_{beat,t2}}{2} \qquad (3)$$

Furthermore, rotation information of the RLG, $\Delta f$, can be determined by taking the difference of the first beat frequency, $f_{beat,t1}$, and the second beat frequency, $f_{beat,t2}$.

$$\Delta f = \frac{f_{beat,t1} - f_{beat,t2}}{2} \qquad (4)$$

Once the FSR between the two first-order SBS beams has been determined, rotation information of the RLG at any time, $\Delta f_{t3}$, can be determined by switching the directions of the co-propagating beams within the ring resonator cavity 50, and determining the optical beat signal, $f_{beat,t2}$. Thus, the rotation information can be determined as:

$$\Delta f_{t3} = f_{beat,t3} - FSR_{t1,t2} = f_{beat,t3} - \frac{f_{beat,t1} + f_{beat,t2}}{2} \qquad (5)$$

Under rotation, the Sagnac effect causes the resonator cavity of the optical ring resonator 50 to appear longer (expanded) for one propagation direction and shorter (compressed) for the other propagation direction, resulting in a resonance frequency shift between CW and CCW directions. A high degree of common mode rejection of noise processes is obtained by generating the two SBS lasers in a common ring cavity. The two SBS signals used to sense rotation can be in the first order of SBS, the second order of SBS, the third order of SBS, and so forth.

Figure 2C:
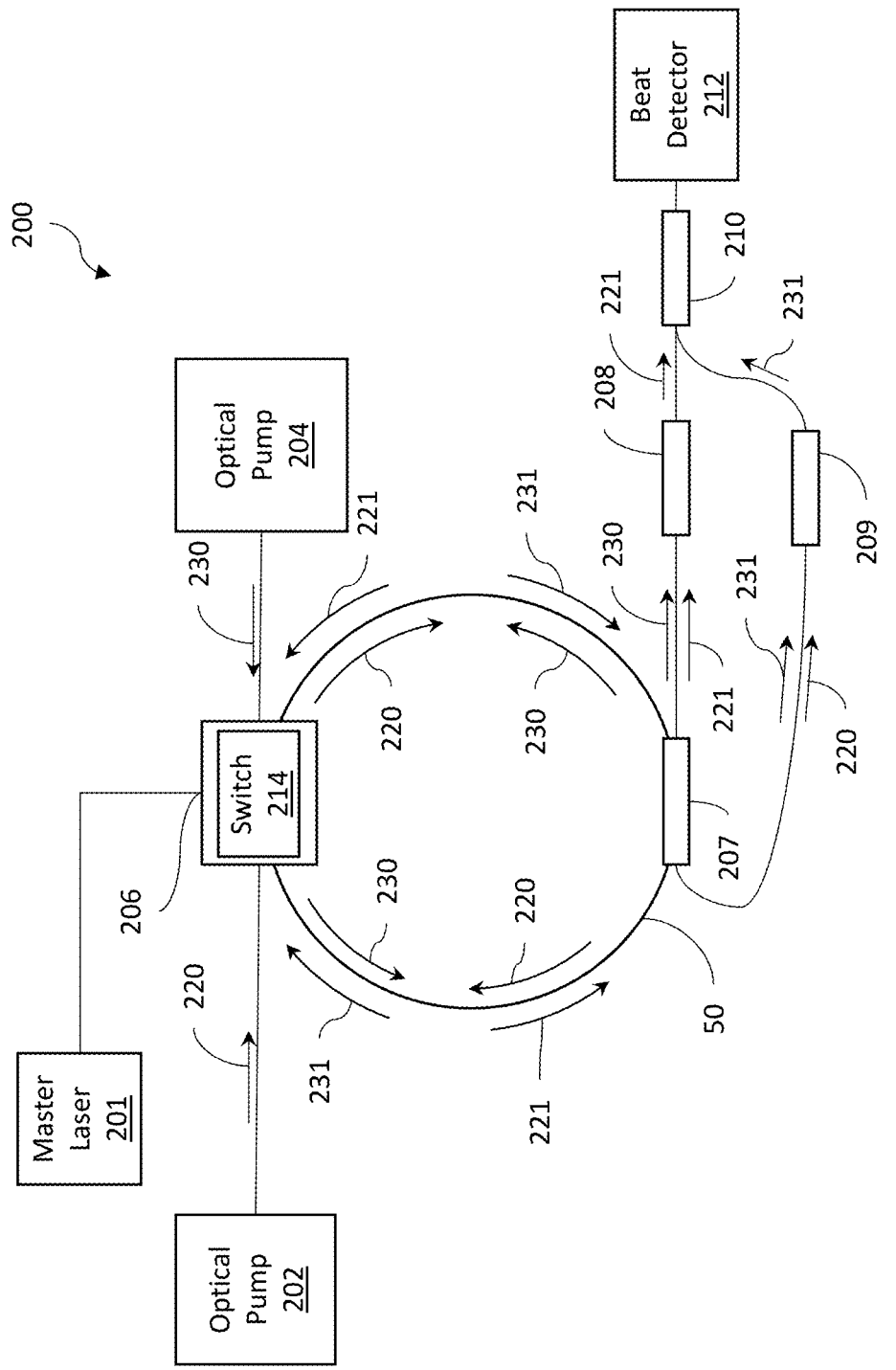
FIG. 2C is a diagram of a portion of an alternative embodiment of a ring laser gyroscope using a reference laser in addition to the embodiments of FIGS. 2A and 2B.

FIG. 2C shows an embodiment of the ring laser gyroscope portion 200 in which a low-power laser 201, also referred to as master laser 201, is coupled to the optical ring resonator 50 through the optical coupler 206. The master laser 201 is configured to produce a low-power stable beam at a resonant frequency of the optical ring resonator. In this embodiment, the first optical source 202 and the second optical source 204 are configured to produce optical pump beams 220 and 230 with frequencies at least one integer FSR apart from the low-power laser of the master laser 201. The other components and descriptions of FIGS. 2A and 2B may apply to this embodiment.

The optical pumped beams 220 and 230 are coupled into the optical ring resonator 50 via the optical coupling region 206. A portion of the first optical pumped beam 220 propagates through the optical ring resonator 50 in a first direction. A portion of the second optical pumped beam 230 propagates through the optical ring resonator 50 in a second direction.

Figure 3:
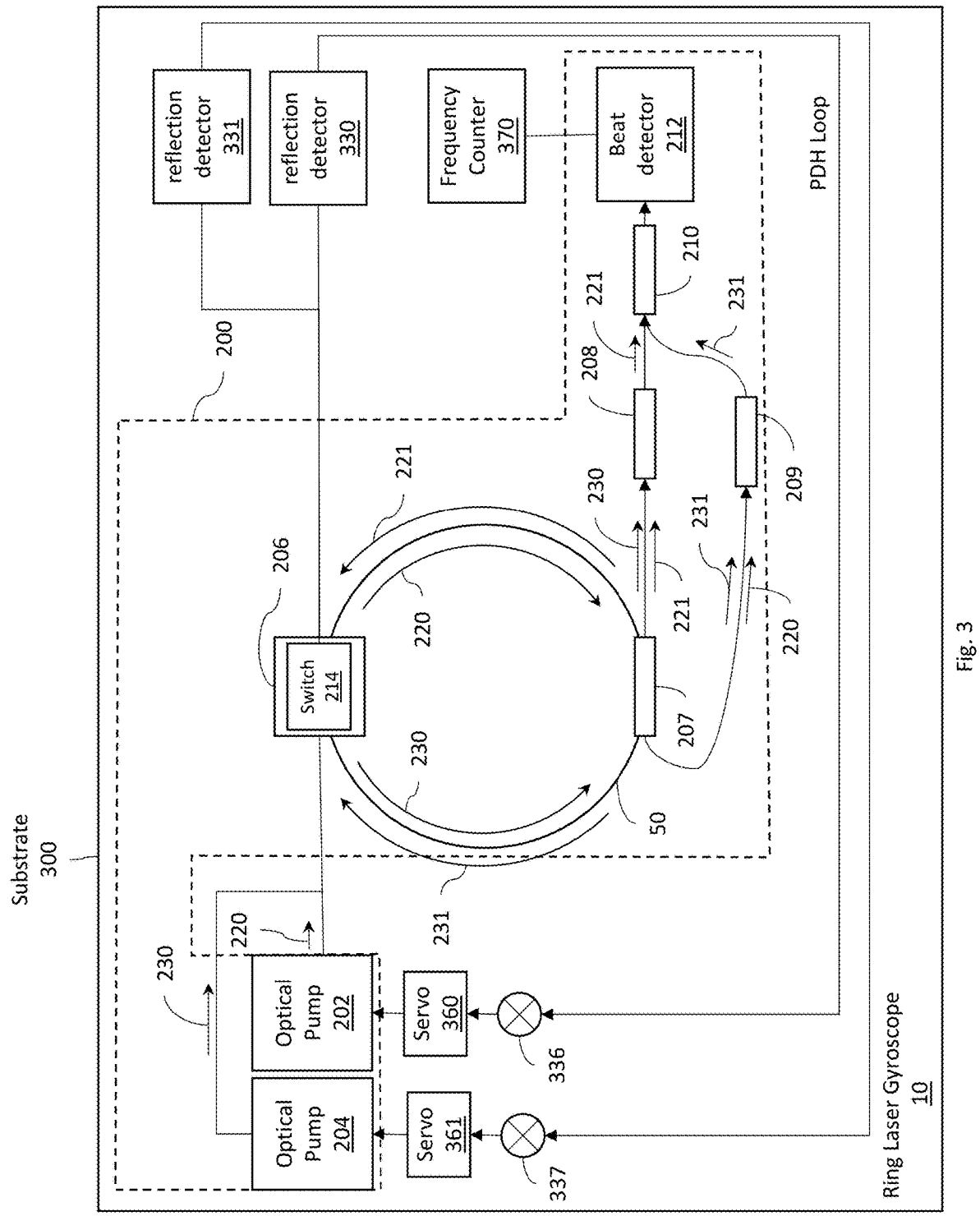
FIG. 3 is a diagram of a ring laser gyroscope using the RLG portion from FIG. 2, according to an embodiment.

FIG. 3 is a diagram of a RLG 10, according to an embodiment. The RLG 10 includes the ring-laser gyroscope portion 200 of FIGS. 2A-2C, a frequency measurement device 370; a first collection of Pound-Drever-Hall (PDH) loop electronics 330 336 360, and a second collection of PDH loop electronics 331 337 361. The PDH loops electronics each include a reflection detector 330 331, a PDH mixer 336 337, and a PDH servo 360 361. The beat detector 212 is configured to output a signal to the frequency measurement device 370. For example, the frequency measurement device 370 is a frequency counter.

The first collection of PDH loop electronics 330 336 360 maintain the tracking of the first optical pumped beam 202 to the resonance frequency of the optical ring resonator 50. The second collection of PDH loop electronics 331 337 361 maintain the tracking of the second optical pumped beam 204 to the resonance frequency of the optical ring resonator 50.

The RLG 10 is positioned in, on, or both in and on, a substrate 300. In some embodiments, one or more of the components of the RLG 10 are formed within the interior area of the substrate 300.

Figure 4:
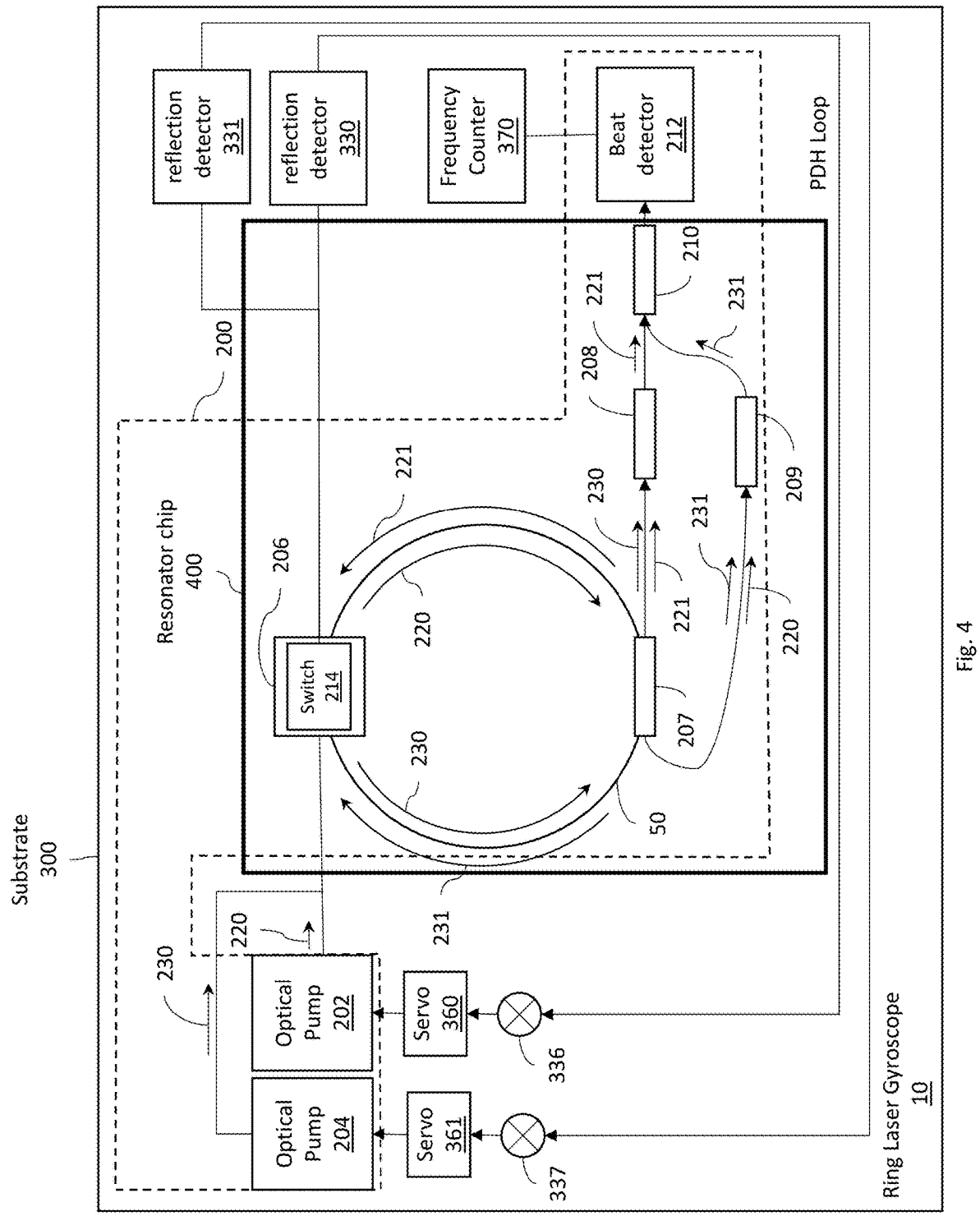
FIG. 4 is an embodiment of a ring laser gyroscope, using the RLG portion from FIG. 2, according to an embodiment.

The readout-out mechanism 370 of RLG 10 is similar to that of a conventional RLG, the best and most expensive of which are also quantum noise limited. However, because the RLG 10 has an ~10.8 GHz frequency splitting even at zero rotation rate, there is little to no risk of backscatter from one mode into the counter-propagating mode seeding the optical pumped beams 220 and 230 and causing the "lock-in" effect that can occur in conventional RLGs, where the counter propagating resonance frequencies become degenerate at small rates. In conventional RLGs, a "dither motor" is often used to prevent resonance frequencies from becoming degenerate at small rates; the dither motor rotates the gyro to ensure that it always measures a rotational rate above the lock-in threshold. That is, the rotational rate is sufficiently large to prevent the lock in effect when the co-propagating beams 220 230 are separated by at least one integer FSR. In contrast, the RLG 10 does not suffer from lock-in and, therefore, can omit a dither motor and any other moving part. FIG. 4 is a diagram of an RLG 10 on a substrate 300, according to an embodiment. The embodiment of the RLG 10 shown in FIG. 4 differs from the embodiment of the RLG 10 shown in FIG. 3 in that the optical ring resonator 50 is on a resonator chip 400. In another embodiment, the chip 400 supports other components of the RLG 10. The optical ring resonator is formed on the chip 400 to minimize round-trip resonator loss, including excess loss at the optical coupling regions 206 and 207.

In an embodiment, the optical pumped beams 220 and 230 are formed on the resonator chip 400 and the waveguide, on which the optical ring resonator 50 is formed, contains the optical pumped beams 220 and 230. In an embodiment, the resonator chip 400 comprises all of the elements of the substrate 300.

It is contemplated that one or more RLG 10 of FIG. 3 and FIG. 4 can be used in a vehicle. In one example, a vehicle contains three RLG 10 each along a different axis of rotation is a three-dimensional (3D) reference frame.

Figure 5:
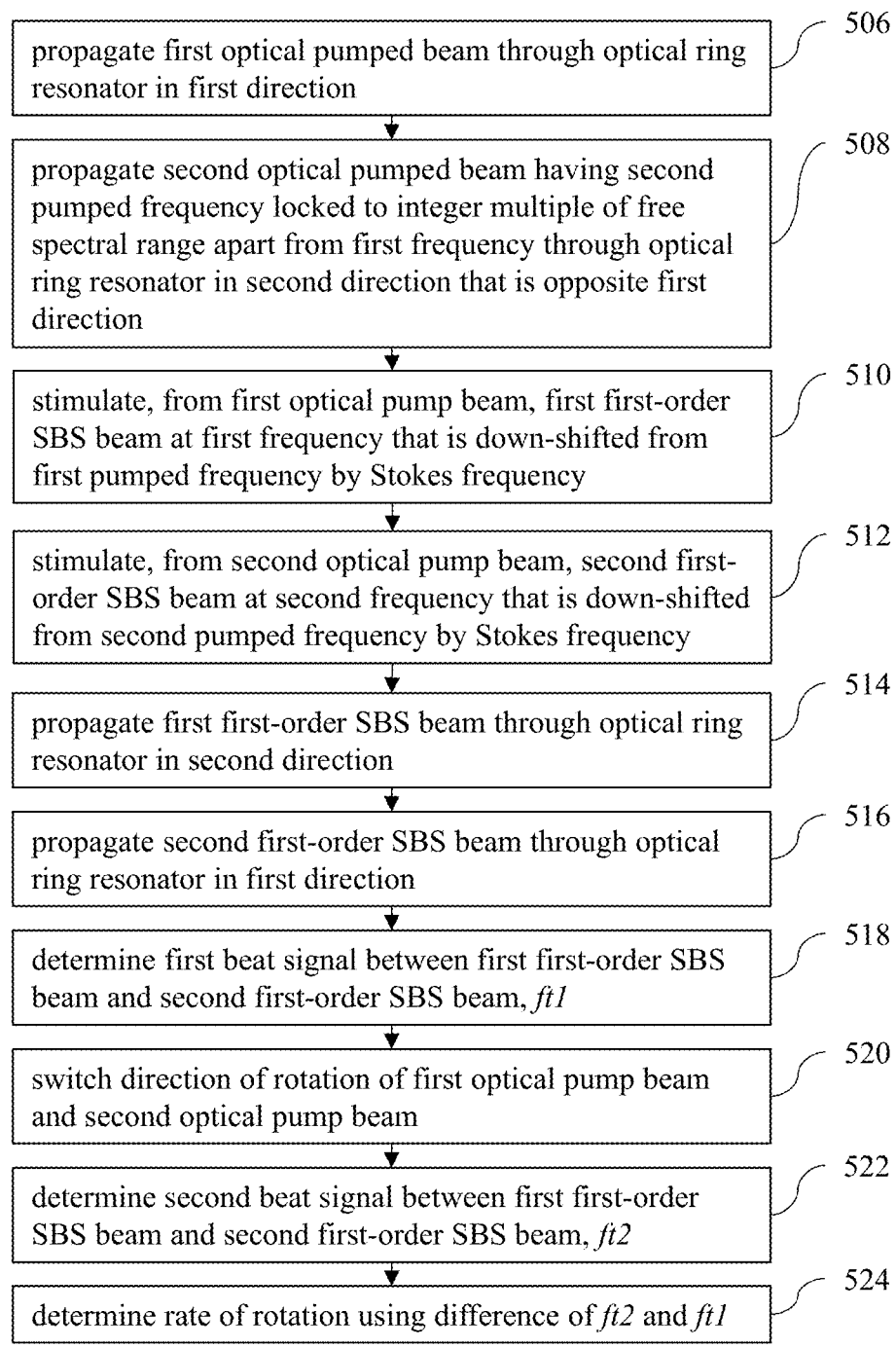
FIG. 5 is a flow chart of a method for measuring rotation of the RLG according to an embodiment.

FIG. 5 is a flow diagram 500 of a method for measuring angular velocity about an axis, according to an embodiment. The flow diagram 500 is described with reference to the RLG 10 of FIG. 3. The embodiment of flow diagram 500 is described as being implemented using the RLG 10 of FIG. 3 that includes the RLG portion 200 of FIG. 2 and the switching results shown in FIG. 1. The process of flow diagram 500 is applicable to other embodiments of RLGs that include the portion 15 of an embodiment of a ring laser gyroscope shown in FIG. 2.

At step 506, a first optical pumped beam 220 having a first pump frequency $v_1$ is locked to an optical ring resonator 50. The first optical pumped beam 220 propagates through the optical ring resonator 50 in a first direction, for example, CW.

At step 508, a second optical pump beam 230 having a second pump frequency $v_2$ is locked to the optical ring resonator 50. The second pump frequency $v_2$ is separated from the first pump frequency $v_1$ by at least one integer multiple of the free spectral range (FSR). The second optical pump beam 230 propagates through the optical ring resonator 50 in a second direction, for example, CCW. As there are only two directions of propagation in the optical ring resonator 50, the first direction and the second direction are opposite each other.

At step 510, the first optical pumped beam 220 stimulates a first first-order stimulated Brillouin scattering (SBS) beam 221 in CCW direction at a first frequency $v_{SBS1}$ that is a different frequency from the first pumped frequency v1 as the first optical pumped beam 220 propagates through the optical ring resonator 50 in the CW direction.

At step 512, the second optical pump beam 230 stimulates a second first-order SBS beam 231 in CW direction at a second frequency $v_{SBS2}$ that is down shifted from the second pump frequency $v_2$ as the second optical pump beam 230 propagates through the optical ring resonator in the second direction, for example, CCW. Because the frequency of the second optical pump beam 230 is separated from the frequency of the first optical pump beam 220 by at least one integer multiple of the FSR, the second frequency $v_{SBS2}$ will also be separated from the first frequency $v_{SBS1}$ by the same number of the FSR.

At step 514, the first first-order SBS beam 221 propagates through the optical ring resonator 50 in the second direction that is opposite the first direction.

At step 516, the second first-order SBS beam 231 propagates through the optical ring resonator 50 in the first direction that is opposite the second direction.

At step 518, the first first-order SBS beam 221 and the second first-order SBS beam 231 are output from the optical coupling region 207 of the optical ring resonator 50 and are combined at a coupler 210. The combined signals are incident on a beat detector 212. A first beat signal $f_{beat1}$ is determined between the first first-order SBS beam 221 and the second first-order SBS beam 231.

At step 520, the switch 214 within the optical coupling 206 switches the directions of the first pump laser beam 220 from the first direction to the second direction, and the second pump laser beam 230 from the second direction to the first direction. As a result, the first first-order SBS beam 221 generated from the first pumped laser beam 220 switches directions from the second direction to the first direction and the second first-order SBS beam 231 generated from the second pumped laser beam 230 switches directions from the first direction to the second direction.

At step 522, the first first-order SBS beam 221 and the second first-order SBS beam 231 are output from the optical coupling region 207 of the optical ring resonator 50 and are combined at the coupler 210. The combined signals are incident SEE ABOVE on a beat detector 212. A second beat signal $f_{beat2}$ is determined between the first first-order SBS beam 221 and the second first-order SBS beam 231.

At step 524, a rate of rotation of the optical ring resonator 50 is determined based on the difference between the first beat signal $f_{beat1}$ and the second beat signal $f_{beat2}$. Furthermore, a free spectral range can be determined based on the summation of the first beat signal $f_{beat1}$ and the second beat signal $f_{beat2}$ and can be used to determine the rate of rotation using further beat signal determinations.

In this manner, a compact, robust ring laser gyroscope is formed on a substrate, and is able to measure the rotation rate without fragile moving parts. The ring laser gyroscopes described herein can be monolithically integrated and are appropriate for thermally extreme environments while being tolerant of high shock, and high vibration applications.

EXAMPLE EMBODIMENTS

Example 1 includes a ring-laser gyroscope, comprising: a first optical pump configured to generate a first pumped beam; a second optical pump configured to generate a second pumped beam; an optical ring resonator configured to generate, in response to the first pumped beam, a first back-scattered beam propagating in a direction opposite to a direction in which the first pumped beam is propagating, and to generate, in response to the second pumped beam, a second back-scattered beam propagating in a direction opposite to a direction in which the second pumped beam is propagating; a switch having a first state in which the switch is configured to cause the first and second pumped beams to propagate in the optical ring resonator in first and second directions, respectively, and having a second state in which the switch is configured to cause the first and second pumped beams to propagate in the optical ring resonator in the second and first directions, respectively; and a detector coupled to the optical ring resonator and configured to determine a first optical beat signal in response to the first and second back-scattered beams while the switch has the first state, and to determine a second optical beat signal in response to the first and second back-scattered beams while the switch has the second state.

Example 2 includes the ring laser gyroscope of Example 1, wherein the first pumped beam has a first frequency and the second pumped beam has a second frequency separated from the first frequency by an integer multiple of the free spectral range.

Example 3 includes the ring laser gyroscope of Examples 1-2, wherein the ring-laser gyroscope further comprises: a first Pound-Drever-Hall loop coupled to the first pumped beam and the switch comprising a first reflection detector, a first PDH mixer, and a first servo, wherein the first Pound-Drever-Hall loop is configured to maintain the first frequency of the first pumped beam; and a second Pound-Drever-Hall loop coupled to the second pumped beam and the switch comprising a second reflection detector, a second PDH mixer, and a second servo, wherein the second Pound-Drever-Hall loop is configured to maintain the second frequency of the second pumped beam.

Example 4 includes the ring laser gyroscope of Examples 1-3, wherein the first direction is one of clockwise and counter-clockwise, and the second direction is the other of clockwise and counter-clockwise.

Example 5 includes the ring laser gyroscope of Examples 1-4, wherein the first backscattered beam and the second backscattered beam are first-order Stimulated Brillouin Scattered ("SBS") beams.

Example 6 includes the ring laser gyroscope of Examples 1-5, wherein the optical ring resonator is a rigid optical waveguide resonator or fiber resonator.

Example 7 includes the ring laser gyroscope of Examples 1-6, wherein the components of the ring laser gyroscope are located on a substrate.

Example 8 includes the ring laser gyroscope of Example 7, wherein the optical ring resonator is embedded in a chip on the substrate.

Example 9 includes the ring laser gyroscope of Examples 1-8, wherein the first backscattered beam has a first backscattered frequency and the second backscattered beam has a second backscattered frequency separated from the first backscattered frequency by about an integer multiple of the free spectral range.

Example 10 includes a method comprising: generating, in an optical ring resonator and in response to a first pumped beam, a first back-scattered beam propagating in a direction; generating, in the optical ring resonator and in response to a second pumped beam, a second back-scattered beam propagating in an opposite direction; determining a first difference between the frequencies of the first and second back-scattered beams; reversing the directions of the first and second back-scattered beams; determining a second difference between the frequencies of the first and second back-scattered beams; determining a third difference between the first and second differences; and determining a rotation of the optical ring resonator in response to the third difference.

Example 11 includes the method of Example 10, wherein the second frequency is locked to a resonance peak that is about an integer number of free spectral ranges apart from the first frequency.

Example 12 includes the method of Examples 11, further comprising: reversing the directions of the first and second back-scattered beams; determining a fourth difference between the frequencies of the first and second back scattered beams; and determining the rotation the ring resonator using the free spectral range of the first and second back-scattered beams and the fourth difference.

Example 13 includes the method of Examples 10-12, wherein the first back-scattered beam and the second back-scattered beam are first-order SBS beams.

Example 14 includes the method of Examples 10-13, further comprising: determining a free spectral range of the first and second back-scattered beams by taking the summation of the second frequency difference and the first frequency difference.

Example 15 includes a system comprising: a navigation system comprising: one or more ring-laser gyroscopes, each of the one or more ring-laser gyroscopes comprising: a first optical pump configured to generate a first pumped beam; a second optical pump configured to generate a second pumped beam; an optical ring resonator configured to generate, in response to the first pumped beam, a first back-scattered pumped beam propagating in a direction opposite to a direction in which the first pumped beam is propagating, and to generate, in response to the second pumped beam, a second back-scattered pumped beam propagating in a direction opposite to a direction in which the second pumped beam is propagating; a switch having a first state in which the switch is configured to cause the first and second pumped beams to propagate in the optical ring resonator in first and second directions, respectively, and having a second state in which the switch is configured to cause the first and second pumped beams to propagate in the optical ring resonator in the second and first directions, respectively; and a detector coupled to the optical ring resonator and configured to determine a first optical beat signal in response to the first and second back-scattered pumped beams while the switch has the first state, and to determine a second optical beat signal in response to the first and second back-scattered pumped beams while the switch has the second state.

Example 16 includes the system of Example 15, further comprising a vehicle, wherein the vehicle is configured to utilize the navigation system.

Example 17 includes the system of Example 16, wherein the vehicle is an aircraft.

Example 18 includes the system of Examples 15-17, wherein the first backscattered beam and the second back-scattered beam are first-order Stimulated Brillouin Scattered ("SBS") beams.

Example 19 includes the system of Examples 15-18, wherein each of the ring-laser gyroscopes are positioned along a different axis.

Example 20 includes the system of Examples 15-19, wherein the ring-laser gyroscope further comprises: a first Pound-Drever-Hall loop coupled to the first pumped beam and the switch comprising a first reflection detector, a first PDH mixer, and a first servo, wherein the first Pound-Drever-Hall loop is configured to maintain the first frequency of the first pumped beam; and a second Pound-Drever-Hall loop coupled to the second pumped beam and the switch comprising a second reflection detector, a second PDH mixer, and a second servo, wherein the second Pound-Drever-Hall loop is configured to maintain the second frequency of the second pumped beam.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A ring-laser gyroscope, comprising:
   a first optical pump configured to generate a first pumped beam;
   a second optical pump configured to generate a second pumped beam;
   an optical ring resonator configured
      to generate, in response to the first pumped beam, a first back-scattered beam propagating in a direction opposite to a direction in which the first pumped beam is propagating, and
      to generate, in response to the second pumped beam, a second back-scattered beam propagating in a direction opposite to a direction in which the second pumped beam is propagating;
   a switch having a first state in which the switch is configured to cause the first and second pumped beams to propagate in the optical ring resonator in first and second directions, respectively, and having a second state in which the switch is configured to cause the first and second pumped beams to propagate in the optical ring resonator in the second and first directions, respectively; and
   a detector coupled to the optical ring resonator and configured
      to determine a first optical beat signal in response to the first and second back-scattered beams while the switch has the first state, and
      to determine a second optical beat signal in response to the first and second back-scattered beams while the switch has the second state.

2. The ring laser gyroscope of claim 1, wherein the first pumped beam has a first frequency and the second pumped beam has a second frequency separated from the first frequency by an integer multiple of the free spectral range.

3. The ring laser gyroscope of claim 2, wherein the ring-laser gyroscope further comprises:
   a first Pound-Drever-Hall loop coupled to the first pumped beam and the switch comprising a first reflection detector, a first PDH mixer, and a first servo, wherein the first Pound-Drever-Hall loop is configured to maintain the first frequency of the first pumped beam; and
   a second Pound-Drever-Hall loop coupled to the second pumped beam and the switch comprising a second reflection detector, a second PDH mixer, and a second servo, wherein the second Pound-Drever-Hall loop is configured to maintain the second frequency of the second pumped beam.

4. The ring laser gyroscope of claim 1, wherein the first direction is one of clockwise and counter-clockwise, and the second direction is the other of clockwise and counter-clockwise.

5. The ring laser gyroscope of claim 1, wherein the first backscattered beam and the second backscattered beam are first-order Stimulated Brillouin Scattered ("SBS") beams.

6. The ring laser gyroscope of claim 1, wherein the optical ring resonator is a rigid optical waveguide resonator or fiber resonator.

7. The ring laser gyroscope of claim 1, wherein the components of the ring laser gyroscope are located on a substrate.

8. The ring laser gyroscope of claim 7, wherein the optical ring resonator is embedded in a chip on the substrate.

9. The ring laser gyroscope of claim 1, wherein the first backscattered beam has a first backscattered frequency and the second backscattered beam has a second backscattered frequency separated from the first backscattered frequency by about an integer multiple of the free spectral range.

10. A method comprising:
    generating, in an optical ring resonator and in response to a first pumped beam, a first back-scattered beam propagating in a direction;
    generating, in the optical ring resonator and in response to a second pumped beam, a second back-scattered beam propagating in an opposite direction;
    determining a first difference between the frequencies of the first and second back-scattered beams;
    reversing the directions of the first and second back-scattered beams;
    determining a second difference between the frequencies of the first and second back-scattered beams;
    determining a third difference between the first and second differences; and
    determining a rotation of the optical ring resonator in response to the third difference.

11. The method of claim 10, wherein the second frequency is locked to a resonance peak that is about an integer number of free spectral ranges apart from the first frequency.

12. The method of claim 11, further comprising:
    reversing the directions of the first and second back-scattered beams;
    determining a fourth difference between the frequencies of the first and second back scattered beams; and
    determining the rotation the ring resonator using the free spectral range of the first and second back-scattered beams and the fourth difference.

13. The method of claim 10, wherein the first back-scattered beam and the second back-scattered beam are first-order SBS beams.

14. The method of claim 10, further comprising: determining a free spectral range of the first and second back-scattered beams by taking the summation of the second frequency difference and the first frequency difference.

15. A system comprising:
    a navigation system comprising:
      one or more ring-laser gyroscopes, each of the one or more ring-laser gyroscopes comprising:
        a first optical pump configured to generate a first pumped beam;
        a second optical pump configured to generate a second pumped beam;
        an optical ring resonator configured
          to generate, in response to the first pumped beam, a first back-scattered pumped beam propagating in a direction opposite to a direction in which the first pumped beam is propagating, and
          to generate, in response to the second pumped beam, a second back-scattered pumped beam propagating in a direction opposite to a direction in which the second pumped beam is propagating;
        a switch having a first state in which the switch is configured to cause the first and second pumped beams to propagate in the optical ring resonator in first and second directions, respectively, and having a second state in which the switch is configured to cause the first and second pumped beams to propagate in the optical ring resonator in the second and first directions, respectively; and
        a detector coupled to the optical ring resonator and configured
          to determine a first optical beat signal in response to the first and second back-scattered pumped beams while the switch has the first state, and to determine a second optical beat signal in response to the first and second back-scattered pumped beams while the switch has the second state.

16. The system of claim 15, further comprising a vehicle, wherein the vehicle is configured to utilize the navigation system.

17. The system of claim 16, wherein the vehicle is an aircraft.

18. The system of claim 15, wherein the first backscattered beam and the second backscattered beam are first-order Stimulated Brillouin Scattered ("SBS") beams.

19. The system of claim 15, wherein each of the ring-laser gyroscopes are positioned along a different axis.

20. The system of claim 15, wherein the ring-laser gyroscope further comprises:
- a first Pound-Drever-Hall loop coupled to the first pumped beam and the switch comprising a first reflection detector, a first PDH mixer, and a first servo, wherein the first Pound-Drever-Hall loop is configured to maintain the first frequency of the first pumped beam; and
- a second Pound-Drever-Hall loop coupled to the second pumped beam and the switch comprising a second reflection detector, a second PDH mixer, and a second servo, wherein the second Pound-Drever-Hall loop is configured to maintain the second frequency of the second pumped beam.

* * * * *